United States Patent [19]
Weissberger et al.

[11] 3,935,425
[45] Jan. 27, 1976

[54] MECHANIZED ELECTRICALLY HEATED WINDSHIELD CLEANER

[76] Inventors: David Weissberger, 25 Lawrence Park Crescent, Bronxville, N.Y. 10708; Isidore Kalichmann, 9231 57th Ave., Rego Park, N.Y. 11373

[22] Filed: Nov. 7, 1973

[21] Appl. No.: 413,522

[52] U.S. Cl............ 219/228; 15/236 R; 15/250.05; 30/140; 30/171; 30/272 R; 219/203; 219/533
[51] Int. Cl.² .... H05B 1/00; A47L 1/06; B26B 7/00
[58] Field of Search............ 219/203, 221, 227–231, 219/240, 533; 30/140, 169, 171, 272 R, 164.5; 15/236 R, 236 A, 245, 105, 250, 250.05, 250.29

[56] References Cited
UNITED STATES PATENTS

| | | | |
|---|---|---|---|
| 1,242,479 | 10/1917 | Russell | 30/272 R |
| 1,940,107 | 12/1933 | Stichler | 30/171 |
| 2,232,367 | 2/1941 | Cherry | 30/272 R |
| 2,511,161 | 6/1950 | Hammond | 30/140 |
| 2,519,946 | 8/1950 | Voelker et al. | 30/169 X |
| 2,673,395 | 3/1954 | Stolk | 219/228 UX |
| 2,700,096 | 1/1955 | Clements | 30/140 |
| 2,719,905 | 10/1955 | Lootens | 219/228 UX |
| 3,211,890 | 10/1965 | Graves | 219/370 |
| 3,642,002 | 2/1972 | Otterstrom | 30/272 R |

FOREIGN PATENTS OR APPLICATIONS

| | | | |
|---|---|---|---|
| 1,116,778 | 2/1956 | France | 30/272 R |
| 925,428 | 3/1955 | Germany | 30/171 |

*Primary Examiner*—A. Bartis
*Attorney, Agent, or Firm*—Lilling & Siegel

[57] ABSTRACT

A hand-held mechanized electrically heated windshield cleaner for removing snow, ice and other material from a motor vehicle windshield includes a hollow pistol-like housing having a gripping portion and a barrel portion extending at right angles thereto. A bearing member at the front of the barrel portion slidably supports an outwardly extending driving shaft. A scraper blade of resilient rubber-like material is secured to the outer end of the shaft. An electric motor in the gripping portion reciprocatingly drives the shaft through an arrangement including a disk rotated by the motor and eccentrically connected to the shaft by means of a connecting rod. An electric heating coil is provided in the blade adjacent the edge thereof. The heating coil and motor are energized by an electric cable adapted to be plugged into the vehicle cigarette lighter socket.

1 Claim, 4 Drawing Figures

MECHANIZED ELECTRICALLY HEATED WINDSHIELD CLEANER

Snow removal devices for motor vehicle windshields, such as cars and trucks, are ubiquitous on the roads of this country, especially during the winter or spring seasons, when windshields tend to be covered with snow, ice and/or mud. The most common snow-removal devices found in automobiles are simple hand-held devices having a scraper blade and/or brush on one or both ends of the handle. Specifically designed for removing hardened ice from a windshield are heater devices generally comprising an electrical coil, generally encased in a rod or other protective element. See, for example U.S. Pat. No. 3,711,679. The melted ice is then scraped off, for example, using a squeezer or soft rubber blade.

Generally, the hand-held devices tend to require a great deal of effort and are extremely slow in removing material, especially a thick incrustation of hardened snow, for example, from a large, full-size automobile windshield. The heater devices are of only slightly greater efficiency, especially when a thick layer of snow is present rather than a thin layer of hardened ice.

This invention provides mechanical means for removing snow, ice, mud and other caked detritus from motor vehicle windshields. The device comprises a handle; a driving rod extending therefrom and slidably mounted therein; a blade secured to the driving rod; driving means within the handle operatively connected to the driving shaft and thus to the blade for driving the blade reciprocatingly in a direction perpendicular to the axis of the blade. The driving means are preferably electrical in nature, such as battery means, and are preferably designed and adapted to be connected, to a source of power, such as the electrical system of a motor vehicle.

There is also provided in accordance with this invention a heating element, situated in the blade of the mechanized device, above, for melting any frozen ice or snow formed on the windshield.

The apparatus of this invention is exemplified by the following specific examples of preferred embodiments thereof. These embodiments merely reflect preferred species and are intended to exemplify the advantages and objects of the present invention. They are not intended to be exclusive of the full scope of this invention which is defined by the claims appended below.

Figure 1:
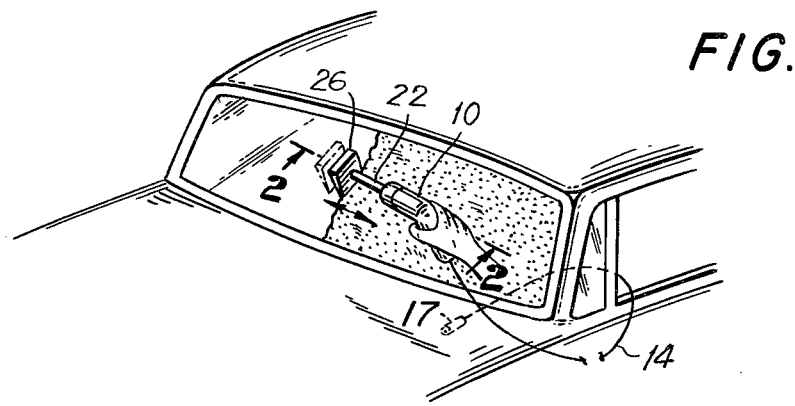
FIG. 1 is a sketch in perspective showing the windshield cleaner of the present invention in operation.

Referring to the drawings, the windshield cleaner of the present invention comprises a handle, or casing, adapted to be held like a pistol (see FIG. 1), containing therewithin an electrical motor 12 connected via two-wire electrical cable 14 to the cigaret lighter of an automobile.

A rotating axle 16 protrudes from the electrical motor 12 and is connected to disc 18. Crank rod 20 is pivotally connected at one end to disc 18 at a point intermediate the axle 16 and the circumference of the disc 18. The second end of crank rod 20 is pivotally connected to one end of driving shaft 22. The crank rod 20 is connected to disc 18 by pin 21 and to driving shaft 22 by pin 23.

Driving shaft 22 extends beyond the end of the case 10 through the journal bearing 24. Blade head 26 is attached to the second end of driving shaft 22, the head 26 is generally in the shape of a triangular prism. As illustrated, the head 26 is connected to the shaft 22 by threaded bolt 27 passing through the head 26 and into a threaded insert in shaft 22.

Figure 2:
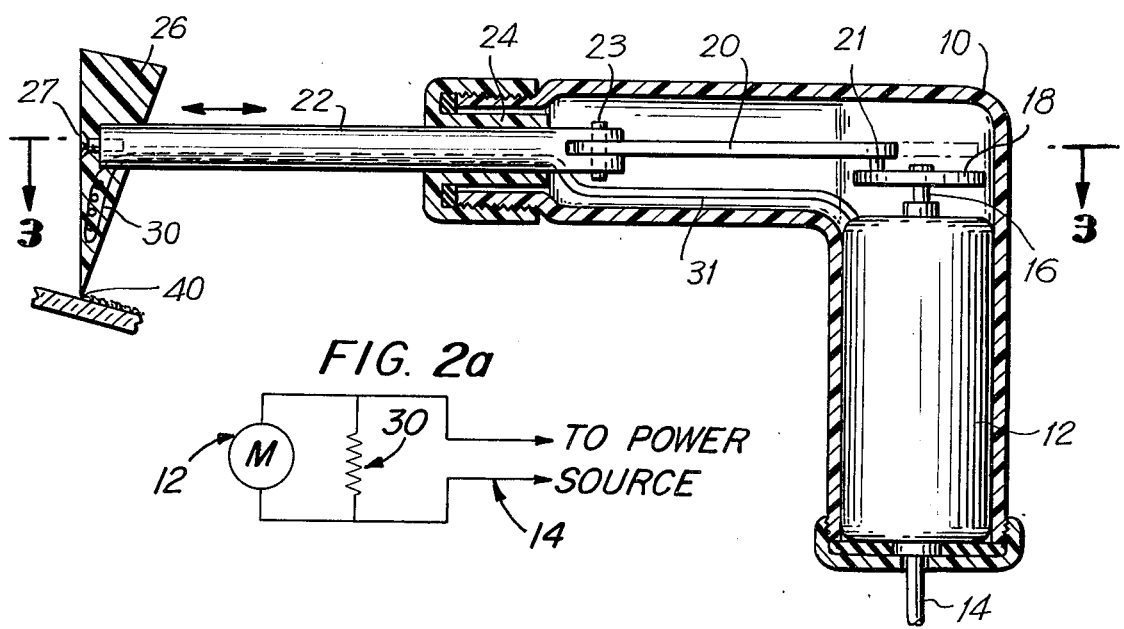
FIG. 2 is a side view in cross-section of the windshield cleaner of the present invention.
Figure 2A:
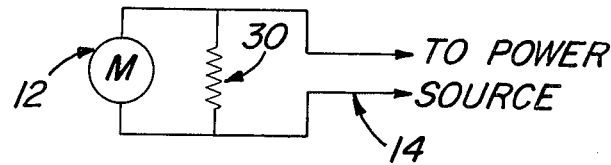
FIG. 2a is a simple schematic diagram showing the parallel circuit connection of the motor and heating element.

Referring to FIG. 2, there is optionally provided a heating 30 embedded in blade head 26 and connected via wires 31 to the source of electrical power. The wires 31 pass through a central opening in shaft 22 into the interior of the case 10 and to a contact point on the electric motor 12. The coil 30 is preferably operated in parallel electric circuit to the motor 12, as shown in the schematic diagram of FIG. 2a.

The blade head 26 is preferably formed of a resilient material which has a rubber-like surface, such that it will not scratch the glass windshield of an automobile or other motor vehicle. Useful such materials include elastomers, such as natural rubber, synthetic rubber, including styrene-butadiene rubber (SBR), butyl rubber, neoprene, polysulfide rubbers, polyurethano rubbers, polybutadiene rubbers and polyisoprene. Other useful materials include other polymers, especially the thermoplastic polymers such as polyethylene, polypropylene, polyvinyl chloride and polycarbonates. When the optional heater coil is embedded in the blade, the blade body must be formed of a material which is heat resistant and which can withstand the temperatures to which it will be raised by the action of the coil. Best for such purposes are high temperature rubber-like materials or polycarbonates. Further, if desired, rubber-coated metals can be used, wherein the rubber is coated on the point of the blade head so as to prevent chipping or scratching of a windshield glass.

The electric motor 12 is a conventional single-phase fractional horsepower motor, generally operated by the direct current from a 6- or 12-volt automobile battery.

In operation, the cord 14 is connected via a plug 17 to the cigaret lighter socket of an automobile, immediately starting off the electric motor 12. Alternatively, if desired, an electrical switch can be connected in-line in electrical cord 14.

The motor 12 causes rotation of disc 18 which in turn causes the oscillating movement of crankrod 20, the first end of which moves in a generally circular pattern, following the movement of pin 21 on disc 18. The second end of crankrod 20, pivotally pinned to the end of shaft 22, moves in a longitudinal direction causing reciprocating movement of shaft 22 and in turn of blade head 26. Thus the rotating movement of disc 18 is converted to reciprocating movement of blade-head 26.

Figure 3:
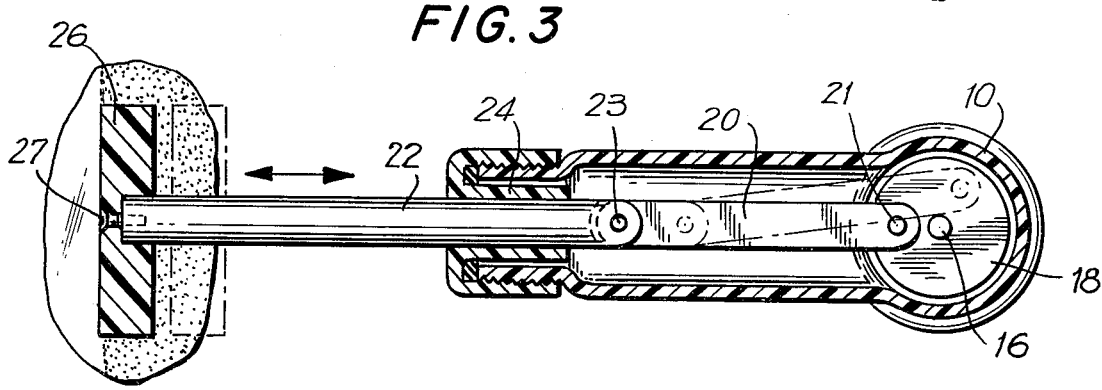
FIG. 3 is a view in cross-section along lines 3—3 of FIG. 2.

The movement of blade head 36 is along a line perpendicular to the direction of a line defined by the edge 40 of the blade-head, as shown in the drawing of FIGS. 1 and 3.

The blade head 26 is applied against the snow or ice on the windshield and proceeds to scrape or chop away the accumulation thereon.

The short reciprocating strokes of the blade-head 26 combined with a large sweeping movement of a blade-head across the surface of the windshield, generated by movement of the arm of the user, creates an extremely effective means for swiftly and completely cleaning a windshield surface.

We claim:

1. A hand-held mechanical device adapted for removing snow, ice, mud and other caked detritus from a motor vehicle windshield; the device comprising a housing of generally onepiece construction having a hollow pistol-like handle portion for gripping and another hollow portion connected thereto and extending therefrom generally at a right angle to said hollow handle portion; bearing means removably secured to the forward end of said other hollow portion of said housing and having a sleeve element forming a central bearing bore; a driving shaft extending from the forward end of said other hollow portion and being slidable supported by said central bearing bore of said sleeve element; a blade secured to said driving shaft and being formed of a resilient rubber-like material; electric motor means within said handle portion of said housing, a rotatable shaft extending from the motor means, a disc mounted for rotation by the rotatable shaft, a connecting rod means connecting the disc to the driving shaft, one end of the rod being pivotably connected to said driving shaft, the other end of the rod being pivotably connected eccentrically to the rotatable disc, whereby upon rotation of the disc by said motor means, the driving shaft is driven in a reciprocating manner; an electrical heating coil embedded in the blade generally adjacent the edge thereof and in parallel electrical circuit connection with the electric motor means, and means for supplying electrical power to said motor means and heating coil for operating same.

* * * * *